(12) United States Patent
Fox

(10) Patent No.: US 9,231,909 B2
(45) Date of Patent: Jan. 5, 2016

(54) COMMUNICATION SYSTEM EMPLOYING SUBNET OR PREFIX TO DETERMINE CONNECTION TO SAME NETWORK SEGMENT

(71) Applicant: International Business Machines Corporation, Armonk, NY (US)

(72) Inventor: Michael Jon Fox, New Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/898,458

(22) Filed: May 20, 2013

(65) Prior Publication Data

US 2014/0344329 A1    Nov. 20, 2014

(51) Int. Cl.
*H04L 29/12*     (2006.01)
*H04L 29/06*     (2006.01)
*G06F 15/173*    (2006.01)
*G06F 15/177*    (2006.01)

(52) U.S. Cl.
CPC ...... *H04L 61/6059* (2013.01); *G06F 15/17331* (2013.01); *H04L 69/16* (2013.01); *H04L 69/167* (2013.01); *G06F 15/177* (2013.01); *H04L 61/6068* (2013.01)

(58) Field of Classification Search
CPC ............ G06F 15/177; G06F 15/17331; H04L 29/06142; H04L 61/6086; H04L 61/6068; H04L 61/6059; H04L 67/141
USPC .................. 709/203, 220, 221, 228; 713/163; 370/216, 254
See application file for complete search history.

(56) References Cited

U.S. PATENT DOCUMENTS

| 7,277,453 | B2 | 10/2007 | Chin |
| 7,433,871 | B2 | 10/2008 | Deforche |
| 2001/0040895 | A1 | 11/2001 | Templin |
| 2004/0088385 | A1* | 5/2004 | Blanchet et al. ............. 709/220 |
| 2006/0087962 | A1* | 4/2006 | Golia et al. ................... 370/216 |
| 2010/0118734 | A1* | 5/2010 | Weilnau et al. ............... 370/254 |
| 2010/0211775 | A1* | 8/2010 | Vogt ............................. 713/163 |
| 2012/0317252 | A1* | 12/2012 | Vemulapalli et al. ......... 709/221 |
| 2013/0347092 | A1* | 12/2013 | McBrearty et al. ............... 726/9 |
| 2014/0156857 | A1* | 6/2014 | F. et al. ........................ 709/228 |

OTHER PUBLICATIONS

Fox—"Shared Memory Communications over RDMA". Internet Draft for TCPM Working Group, IBM, Dec. 13, 2012. p. 26-31.*
Auer—"IPv6 Prefix Primer"; IPv6 Now Pty Ltd, Copyright 2008-2011; 2005; pp. 1-3.
Cisco—"IP Addressing and Subnetting for New Users"; Sep. 26, 2005, pp. 1-10.
Das—"IPv6 Addressing"; IPv6.com Inc, Copyright 2008; pp. 1-2.

(Continued)

*Primary Examiner* — Joseph E Avellino
*Assistant Examiner* — Patrick Ngankam
(74) *Attorney, Agent, or Firm* — Parashos Kalaitzis; Mark P Kahler

(57) ABSTRACT

The disclosed communication system may employ a first protocol for communication over a network connection. The communication system may use subnet information or prefix information to determine if the network connection qualifies for using a second protocol. If the communication system determines that the network connection qualifies, the communication system employs the second protocol for communication over the network connection.

14 Claims, 10 Drawing Sheets

(56) References Cited

OTHER PUBLICATIONS

Dente, Fox—"OSPF Tutorial for z/OS Communications Server", presentation at Share Anaheim, Capistrano, Mar. 2, 2005, pp. 1-70.
Fox—"Shared Memory Communications over RDMA", Internet Draft for TCPM Working Group, IBM, Dec. 13, 2012, pp. 1-262.
Mitchell—"ARP-Address Resolution Protocol", downloaded from www.about.com on May 19, 2013, p. 1.
Recio—"A Tutorial of the RDMA Model", downloaded from http://archive.hpcwire.com/hpc/885757.html; Sep. 15, 2006, pp. 1-6.
Stevens—"IETF-84 TCPM Work Group TCP Option for SMC-R", Jul. 12, 2012, pp. 1-8.

* cited by examiner

COMMUNICATION SYSTEM EMPLOYING SUBNET OR PREFIX TO DETERMINE CONNECTION TO SAME NETWORK SEGMENT

BACKGROUND

The disclosures herein relate generally to information handling systems (IHSs), and more specifically, to IHSs that communicate with other particular IHSs. Multiple IHSs may be connected together via a communication network. IHSs may utilize a multitude of protocols to facilitate communication with one another over a communication network.

BRIEF SUMMARY

In one embodiment, a method is disclosed that includes establishing a network connection between a first information handling system (IHS) and a second IHS, the first and second IHSs including respective interfaces, the network connection being a network connection that uses a first protocol version that employs subnets or a second protocol version that employs prefixes. The method also includes receiving, from the first IHS by the interface of the second IHS, a proposal including subnet information related to the interface of the first IHS if the network connection is employing the first protocol version for the network connection. The method further includes receiving, from the first IHS by the interface of the second IHS, a proposal including prefix information including a list of prefixes related to the interface of the first IHS if the network connection is employing the second protocol version for the network connection. The method still further includes determining, by the second IHS, subnet information or prefix information related to the interface of the second IHS that receives the proposal. The method also includes testing, by the second IHS, to determine if the subnet information of the interface of the second IHS matches the subnet information of the interface of the first IHS or the prefix information matches at least one prefix of the list of prefixes. The method further includes qualifying, by the second IHS, the network connection to employ a particular protocol if there is a match between the subnet information of the interface of the second IHS and the subnet information of the interface of the first IHS or there is a match between the prefix information of the interface of the second IHS and at least one prefix of the list of prefixes, and otherwise disqualifying the network connection from using the particular protocol if there is no match.

In another embodiment, a network IHS is disclosed that includes a processor. The network IHS also includes a memory coupled to the processor. The memory includes a networking stack that is configured to establish a network connection between the network IHS and another IHS, the network IHS and the another IHS including respective interfaces, the network connection being a network connection that uses a first protocol version that employs subnets or a second protocol version that employs prefixes. The networking stack is also configured to receive, from the another IHS via the interface of the network IHS, a proposal including subnet information related to the interface of the another IHS if the network connection is employing the first protocol version for the network connection. The networking stack is further configured to receive, from the another IHS via the interface of the network IHS, a proposal including prefix information including a list of prefixes related to the interface of the another IHS if the network connection is employing the second protocol version for the network connection. The networking stack is still further configured to determine subnet information or prefix information related to the interface of the network IHS that receives the proposal. The networking stack is also configured to test to determine if the subnet information of the interface of the network IHS matches the subnet information of the interface of the another IHS or the prefix information matches at least one prefix of the list of prefixes. The networking stack is also configured to qualify the network connection to employ a particular protocol if there is a match between the subnet information of the interface of the network IHS and the subnet information of the interface of the another IHS or there is a match between the prefix information of the interface of the network IHS and at least one prefix of the list of prefixes, and otherwise disqualifying the network connection from using the particular protocol if there is no match.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
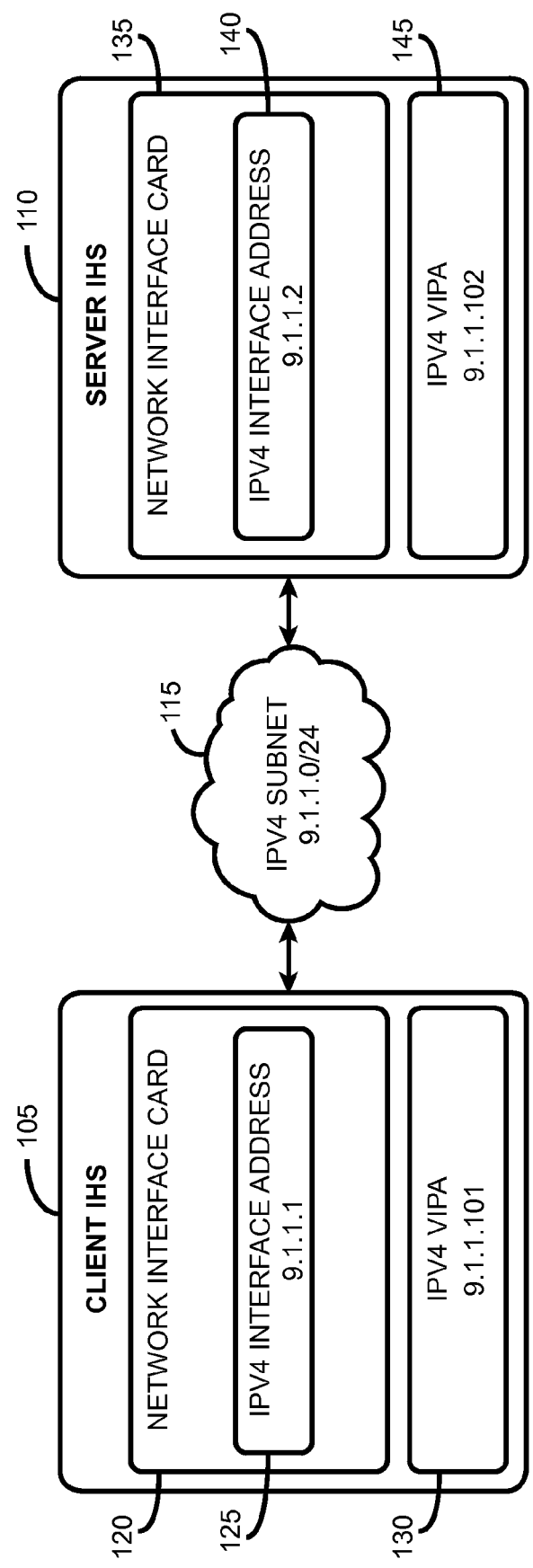
FIG. 1 is a block diagram showing one embodiment of the disclosed communication system.

The disclosed communication system employs subnet information or prefix information to determine connection to the same network segment of a network. The communication system includes a client information handling system (IHS) and a server IHS. The network couples the client IHS and server IHS together, thus allowing the client IHS and server IHS to communicate with one another. In one embodiment, the client IHS and server IHS utilize Internet Protocol version 4 (IPv4) of an Internet Protocol Suite to communicate via the network. In another embodiment, the client IHS and server IHS utilize Internet Protocol version 6 (IPv6) of the Internet Protocol Suite, to communicate via the network. The server IHS may alternatively be referred to as a network IHS because it couples to a network.

The client IHS and server IHS may each include a network interface card (NIC) to connect by wire or wirelessly to the network. Respective Internet Protocol (IP) interface addresses may identify the NIC in the client IHS and the NIC in the server IHS. In another embodiment, the NIC in the client IHS and the NIC in the server IHS may each also be identified by respective link local addresses. The client IHS and server IHS may also be identified by respective virtual internet protocol addresses (VIPAs), or multiple VIPAs. A VIPA is associated with its respective client IHS or server IHS, or with a specific client or server application program running on the client IHS or server IHS. The VIPA is not dependent on the NIC in the client IHS or server IHS. For example, if the client IHS includes multiple NICs, the VIPA may use any of the NICs in the client IHS.

In one embodiment, the IP interface address and VIPA of the client IHS, and the IP interface address and VIPA of the server IHS, and the network coupling the client IHS to the server IHS, may all be on the same subnet. In another embodiment, the IP interface address and VIPA of the client IHS and the IP interface address and VIPA of the server IHS, and the network coupling the client IHS to the server IHS, may all be on the same prefix. In yet another embodiment, the IP interface address of the client IHS and the IP interface address of the server IHS, and the network coupling the client IHS to the server IHS, may all be on the same subnet. The VIPA of the client IHS and the VIPA of the server IHS may be on different subnets or on different networks entirely. In yet another embodiment, the IP interface address of the client IHS and the IP interface address of the server IHS, and the network coupling the client IHS to the server IHS, may all be on the same prefix. The VIPA of the client IHS and the VIPA of the server IHS may be on different prefixes or on different networks entirely.

In one embodiment of the disclosed communication system that employs subnet information or prefix information to determine connection to the same network segment, the client IHS may perform a handshake to attempt to establish a connection to the server IHS via the network. To do this, the client IHS may transmit a request from the VIPA of the client IHS to the VIPA of the server IHS to initiate connection from the client IHS to the server IHS. The request to initiate connection from the VIPA of the client IHS to the VIPA of the server IHS may also indicate to the server IHS that the client IHS may utilize a particular protocol to communicate after the VIPA of the client IHS and VIPA of the server IHS establish a connection.

In response to receiving the request to initiate connection from the VIPA of the client IHS, the VIPA of the server IHS may transmit an acknowledgement to the VIPA of the client IHS. The acknowledgement sent by the VIPA of the server IHS to the VIPA of the client IHS may notify the VIPA of the client IHS that the transmission of the request to initiate connection from the VIPA of the client IHS to the VIPA of the server IHS was successful. In response to receiving the acknowledgement from the VIPA of the server IHS, the VIPA of the client IHS may transmit an acknowledgement to the VIPA of the server IHS. The acknowledgement sent by the VIPA of the client IHS to the VIPA of the server IHS may notify the VIPA of the server IHS that the transmission of the acknowledgement from the VIPA of the server IHS to the VIPA of the client IHS was successful.

With the handshake complete, the VIPA of the client IHS may establish communication to the VIPA of the server IHS. In this case, the VIPA of the client IHS is at one end of the connection and the VIPA of the server IHS at the other end of the connection. Thus, in this embodiment, the VIPA of the client IHS and the VIPA of the server IHS are each an endpoint of the established connection between the client IHS and the server IHS. The VIPA of the client IHS is the client endpoint, and the VIPA of the server IHS is the server endpoint for the established connection. The client endpoint may transmit data that the server endpoint may receive and similarly, the server endpoint may transmit data that the client endpoint may receive.

For example, the client IHS may transmit a Transmission Control Protocol (TCP) segment encapsulated in an IP datagram from the VIPA of the client IHS to the VIPA of the server IHS. The TCP segment may include the source IP address, the destination IP address and an option 253 indicating that a SMC-R proposal message will follow the establishment of the TCP connection. The source IP address may be the VIPA of the client IHS and the destination IP address may be the VIPA of the server IHS. The VIPA of the server IHS may acknowledge receipt of the connection request to the VIPA of the client IHS. The VIPA of the client IHS, i.e. client endpoint, may then complete the handshake by responding to the VIPA of the server IHS, i.e., the server endpoint. With a successful handshake, the client endpoint establishes a connection to the server endpoint, thus enabling the client endpoint to communicate to the server endpoint via the network.

Remote Direct Memory Access (RDMA) allows direct access from the memory of a client IHS to a server IHS without utilizing the operating system (OS) of the client IHS or the OS of the server IHS. RDMA is non-routable, i.e., if the client endpoint and the server endpoint are not connected to the same subnet or prefix, the client endpoint cannot communicate with the server endpoint with RDMA. Shared Memory Communications (SMC) over RDMA (SMC-R) protocol may qualify the connection between two endpoints. The connection may qualify if the physical interfaces, i.e., NIC and/or RNIC, of the respective endpoints are on the same network segment, i.e., same subnet or prefix. For example, if the NIC of client IHS is on the same subnet as the NIC of server IHS, the connection between the client endpoint and the server endpoint may qualify. If the IP interface address associated with the NIC of the client IHS and the IP interface address associated with the NIC of the server IHS are not on the same subnet or prefix, the connection may not qualify.

In one embodiment, the client endpoint may transmit an SMC-R proposal message to the server endpoint. The SMC-R proposal message may include subnet information of the network that couples to the NIC of the client IHS to which the client's IP interface address is associated. In one embodiment, subnet information includes the subnet of the network that couples to the NIC of the client IHS to which the client's IP interface address is associated. The server endpoint may receive the SMC-R proposal message from the client endpoint. The server endpoint may then compare the subnet information from the SMC-R proposal message to the subnet of the network that couples to the NIC of the server IHS to which the server's IP interface address is associated. If the subnet information utilized by the network that couples to the NIC of the server IHS to which the server's IP interface address is associated is not the same as the subnet information sent by the client endpoint in the SMC-R proposal message, the connection does not qualify to use an RDMA protocol such as the SMC-R protocol. In that case, the server endpoint may transmit an SMC-R decline message to the client endpoint that may include the reason for the failure to qualify as the subnet not being the same.

If the subnet of the network that the IP interface address associated with the NIC of the server IHS connects to is the same as the subnet sent by the client endpoint in the SMC-R proposal message, the connection qualifies. If the connection qualifies, the connection is suitable for transmitting information using the SMC-R protocol and the server endpoint may transmit an SMC-R accept message to the client endpoint. Upon receipt of the SMC-R accept message from the server endpoint, the client endpoint may transmit a SMC-R confirm message to the server endpoint. The server endpoint may receive the SMC-R confirm message from the client endpoint. With the handshake complete, the server endpoint and client endpoint may establish a connection utilizing the SMC-R protocol.

In another embodiment, the client endpoint may transmit an SMC-R proposal message to the server endpoint. The SMC-R proposal message may include a list of prefixes utilized by the network that couples to the NIC of the client IHS to which the client's IP global address and the client's IP link local address are associated. The server endpoint may receive the SMC-R proposal message from the client endpoint. The server endpoint may then compare the list of prefixes from the SMC-R proposal message to the prefixes of the network that couples to the NIC of the server IHS to which the server's IP global address and the server's IP link local address are associated. If none of the prefixes utilized by the network that couples to the NIC of the server IHS to which the server's IP global address and the server's IP link local address are associated match any prefixes in the list of prefixes sent by the client endpoint in the SMC-R proposal message, the connection does not qualify to use an RDMA protocol such as the SMC-R protocol. In that case, the server endpoint may transmit an SMC-R decline message to the client endpoint that may include the reason for the failure to qualify as the subnet not being the same.

If any of the prefixes utilized by the network that couples to the NIC of the server IHS to which the server's IP global address and the server's IP link local address are associated matches any prefix in the list of prefixes sent by the client endpoint in the SMC-R proposal message, the connection qualifies to use an RDMA protocol such as the SMC-R protocol. If the connection qualifies, the connection is suitable for transmitting information using the SMC-R protocol and the server endpoint may transmit a SMC-R accept message to the client endpoint. Upon receipt of the SMC-R accept message from the server endpoint, the client endpoint may transmit an SMC-R confirm message to the server endpoint. The server endpoint may receive the SMC-R confirm message from the client endpoint. With the handshake complete, the server endpoint and client endpoint may establish a connection utilizing the SMC-R protocol.

FIG. 1 is a block diagram showing one embodiment of the disclosed communication system 100. Client IHS 105 may include a network interface card (NIC) 120 that couples by wire or wirelessly to network 115. In one embodiment, network 115 is an IPv4 subnet with the address 9.1.1.0/24. The IPv4 interface address 125 of NIC 120 may be address 9.1.1.1. The IPv4 interface address 125 falls in the range of 9.1.1.0 to 9.1.1.254 of subnet 9.1.1.0/24 of network 115, and thus the IPv4 interface address 125 is in the subnet 9.1.1.0/24 of network 115.

The IPv4 Virtual Internet Protocol Address (VIPA) 130 of client IHS 105 may be address 9.1.1.101. The IPv4 VIPA 130 falls in the range of 9.1.1.0 to 9.1.1.255 of subnet 9.1.1.0/24 of network 115, and thus the IPv4 VIPA 130 is in the subnet 9.1.1.0/24 of network 115.

Server IHS 110 may include a network interface card (NIC) 135 that couples by wire or wirelessly to network 115. In one embodiment, server IHS 110 may alternatively be referred to as a network IHS because it couples to network 115. Another IHS, namely the client IHS 105, also couples to network 115. In server IHS 110, the IPv4 interface address 140 of NIC 135 may be address 9.1.1.2. The IPv4 interface address 140 falls in the range of 9.1.1.0 to 9.1.1.255 of subnet 9.1.1.0/24 of network 115, and thus the IPv4 interface address 140 is in the subnet 9.1.1.0/24 of network 115.

The IPv4 VIPA 145 of server IHS 115 may be address 9.1.1.102. The IPv4 VIPA 145 falls in the range of 9.1.1.0 to 9.1.1.255 of subnet 9.1.1.0/24 of network 115, and thus the IPv4 VIPA 145 is in the subnet 9.1.1.0/24 of network 115.

In communication system 100 that employs IPv4, IPv4 interface address 125, IPv4 VIPA 130, IPv4 interface address 140 and IPv4 VIPA 145 all share the same subnet 9.1.1.0/24 of network 115. Even though IPv4 VIPA 130 of client IHS 105 and IPv4 VIPA 145 of server IHS 110 are both on the same IPv4 subnet 9.1.1.0/24 of network 115, transmissions between those VIPAs over network 115 may not necessarily originate from an IPv4 interface address on IPv4 subnet 9.1.1.0/24 of network 115 or terminate to an IPv4 interface address on IPv4 subnet 9.1.1.0/24 of network 115. IPv4 VIPA 130 of the client IHS 105 may perform a handshake to attempt to establish a connection to the server IHS 110 via the network 115. To do this, the client IHS 105 may transmit a request from the IPv4 VIPA 130 of the client IHS 105 to the IPv4 VIPA 145 of the server IHS 110 to initiate connection from the client IHS 105 to the server IHS 110. The request to initiate connection from the IPv4 VIPA 130 of the client IHS 105 may also indicate to the server IHS 110 that the client IHS 105 may utilize a particular protocol to communicate with server IHS 110 after the IPv4 VIPA 130 of the client IHS 105 and IPv4 VIPA 145 of the server IHS 110 establish a connection. In one embodiment, communication system 100 establishes a TCP/IP connection between IPv4 VIPA 130 of client IHS 105 and IPv4 VIPA 145 of server IHS 110.

In response to receiving the request to initiate connection from the IPv4 VIPA 130 of the client IHS 105, the IPv4 VIPA 145 of the server IHS 110 may transmit an acknowledgement to the IPv4 VIPA 130 of the client IHS 105. The acknowledgement sent by the IPv4 VIPA 145 of the server IHS 110 to the IPv4 VIPA 130 of the client IHS 105 may notify the IPv4 VIPA 130 of the client IHS 105 that the transmission of the request to initiate connection from the IPv4 VIPA 130 of the client IHS 105 to the IPv4 VIPA 145 of the server IHS 110 was successful. In response to receiving the acknowledgement from the IPv4 VIPA 145 of the server IHS 110, the IPv4 VIPA 130 of the client IHS 105 may transmit an acknowledgement to the IPv4 VIPA 130 of the server IHS 110. The acknowledgement sent by the IPv4 VIPA 130 of the client IHS 105 to the IPv4 VIPA 145 of the server IHS 110 may notify the IPv4 VIPA 145 of the server IHS 110 that the transmission of the acknowledgement from the IPv4 VIPA 145 of the server IHS 110 to the IPv4 VIPA 130 of the client IHS 105 was successful.

With the handshake complete, the IPv4 VIPA 130 of the client IHS 105 may establish communication to the IPv4 VIPA 145 of the server IHS 110. In this case, the IPv4 VIPA 130 of the client IHS 105 is at one end of the connection and the IPv4 VIPA 145 of the server IHS 110 at the other end of the connection. Thus, in this embodiment, the IPv4 VIPA 130 of the client IHS 105 and the IPv4 VIPA 110 of the server IHS 110 are each an endpoint of the established connection between the client IHS 105 and the server IHS 110. The IPv4 VIPA 130 of the client IHS 105 is the client endpoint, and the IPv4 VIPA 145 of the server IHS 110 is the server endpoint for the established connection over network 115. The client endpoint may transmit data that the server endpoint may receive and similarly, the server endpoint may transmit data that the client endpoint may receive.

In one embodiment, the client endpoint may transmit an SMC-R proposal message to the server endpoint. The SMC-R proposal message may include subnet information of the network 115 that couples to the NIC 125 of the client IHS 105 to which the IPv4 interface address 125 is associated. In one embodiment, subnet information includes IPv4 subnet address 9.1.1.0/24 of the network 115 that couples to the NIC 125 of the client IHS 105 to which the IPv4 interface address 125 is associated. The server endpoint may receive the SMC-R proposal message from the client endpoint. The server endpoint may then compare the subnet information from the SMC-R proposal message to the IPv4 subnet address 9.1.1.0/24 of the network 115 that couples to the NIC 135 of the server IHS 110 to which the IPv4 interface address 140 is associated.

If the IPv4 subnet address 9.1.1.0/24 of the network 115 that the IPv4 interface address 140 associated with the NIC 135 of the server IHS 110 connects to is the same as the subnet information sent by the client endpoint in the SMC-R proposal message, the connection qualifies. In another embodiment, if the IPv4 interface address 140 associated with the NIC 135 of the server IHS 110 is in the same subnet as the subnet information sent by the client endpoint in the SMC-R proposal message, the connection qualifies. For example, IPv4 interface address 140 exhibits an address of 9.1.1.2. IPv4 subnet 9.1.1.0/24 of network 115 spans the range of addresses from 9.1.1.0 to 9.1.1.255. Since IPv4 interface address 140 exhibits an address of 9.1.1.2, within the IPv4 subnet 9.1.1.0/24 of network 115, the connection qualifies.

If the connection qualifies, the connection is suitable for transmitting information using the SMC-R protocol and the server endpoint may transmit an SMC-R accept message to the client endpoint. Upon receipt of the SMC-R accept message from the server endpoint, the client endpoint may transmit a SMC-R confirm message to the server endpoint. The server endpoint may receive the SMC-R confirm message from the client endpoint. With the handshake complete, the server endpoint and client endpoint may establish a connection utilizing the SMC-R protocol.

If the subnet information utilized by the network 115 that couples to the NIC 135 of the server IHS 110 to which the IPv4 interface address 140 is associated is not the same as the subnet information sent by the client endpoint in the SMC-R proposal message, the connection does not qualify to use an RDMA protocol such as the SMC-R protocol. In one embodiment, IPv4 interface address 140 may exhibit an address of 9.1.2.2 (not shown). IPv4 subnet 9.1.1.0/24 of network 115 spans the range of addresses from 9.1.1.0 to 9.1.1.255. Since IPv4 interface address 140 exhibits an address of 9.1.2.2, not within the IPv4 subnet 9.1.1.0/24 of network 115, the connection does not qualify. In that case, the server endpoint may transmit an SMC-R decline message to the client endpoint. The SMC-R decline message may include "not the same subnet" as the reason for the failure to qualify.

Figure 2:
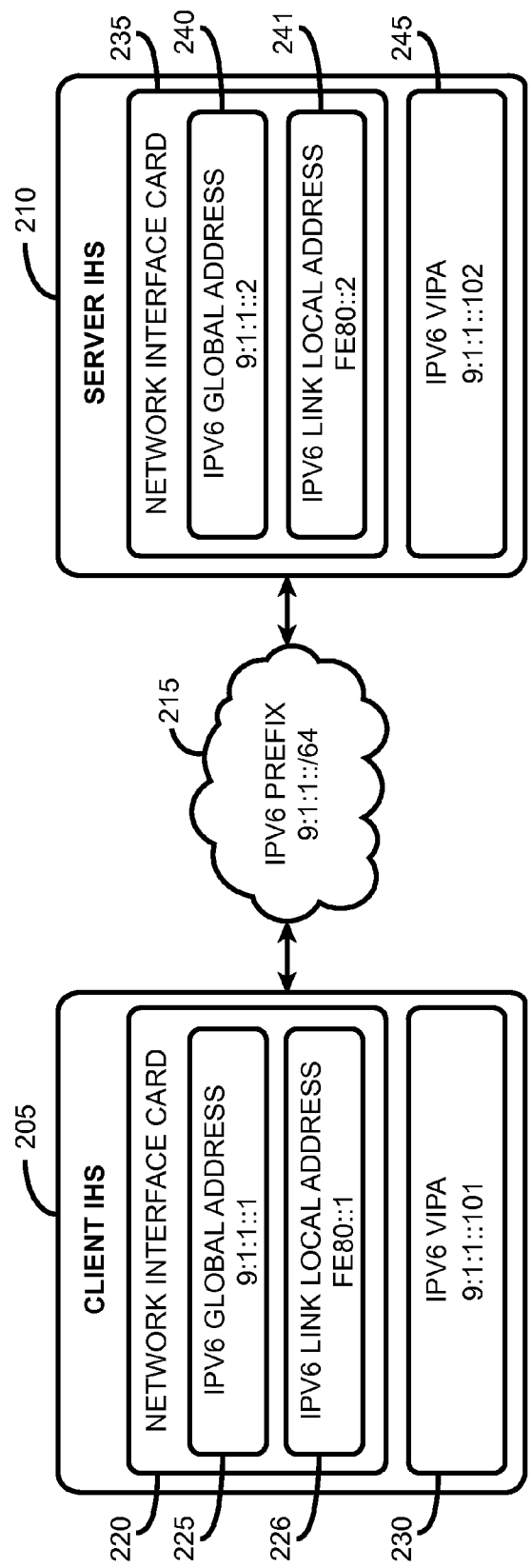
FIG. 2 is a block diagram showing another embodiment of the disclosed communication system.

FIG. 2 is a block diagram showing another embodiment of the disclosed communication system 200. Client IHS 205 may include a network interface card (NIC) 220 that couples by wire or wirelessly to network 215. In one embodiment, network 215 is an IPv6 prefix with the address 9:1:1::0/64. The IPv6 global address 225 of NIC 220 exhibits address 9:1:1::1. The IPv6 link local address 226 of NIC 220 exhibits address FE80::1. The IPv6 global address 225 falls in the range of prefix 9:1:1::/64 of network 215, and thus the IPv6 global address 225 is in the prefix 9:1:1::/64 of network 215.

The IPv6 VIPA 230 of client IHS 205 may be address 9:1:1::101. The IPv6 VIPA 230 falls in the range of prefix 9:1:1::/64 of network 215, and thus the IPv6 VIPA 230 is in the prefix 9:1:1::/64 of network 215.

Server IHS 210 may include a network interface card (NIC) 235 that couples by wire or wirelessly to network 215. The IPv6 global address 240 of NIC 235 may be address 9:1:1::2. The IPv6 link local address 241 of NIC 220 exhibits address FE80::2. The IPv6 interface address 240 falls in the range of prefix 9:1:1::/64 of network 215, and thus the IPv6 interface address 240 is in the prefix 9:1:1::/64 of network 215.

The IPv6 VIPA 245 of server IHS 215 exhibits address 9:1:1::102. The IPv6 VIPA 245 falls in the range of prefix 9:1:1::/64 of network 215, and thus the IPv6 VIPA 245 is in the prefix 9:1:1::/64 of network 215.

In communication system 200 that employs IPv6, IPv6 global address 225, IPv6 VIPA 230, IPv4 global address 240 and IPv6 VIPA 245 all share the same prefix 9:1:1::/64 of network 215. IPv6 VIPA 230 of the client IHS 205 may perform a handshake to attempt to establish a connection to the server IHS 210 via the network 215. To do this, the client IHS 205 may transmit a request from the IPv6 VIPA 230 of the client IHS 205 to the IPv6 VIPA 245 of the server IHS 210 to initiate connection from the client IHS 205 to the server IHS 210. The request to initiate connection from the IPv6 VIPA 230 of the client IHS 205 may also indicate to the server IHS 210 that the client IHS 205 may utilize a particular protocol to communicate with server IHS 210 after the IPv6 VIPA 230 of the client IHS 205 and IPv6 VIPA 245 of the server IHS 210 establish a connection. In one embodiment, communication system 200 establishes a TCP/IP connection between IPv6 VIPA 230 of client IHS 205 and IPv6 VIPA 245 of server IHS 210.

In response to receiving the request to initiate connection from the IPv6 VIPA 230 of the client IHS 205, the IPv6 VIPA 245 of the server IHS 210 may transmit an acknowledgement to the IPv6 VIPA 230 of the client IHS 205. The acknowledgement sent by the IPv6 VIPA 245 of the server IHS 210 to the IPv6 VIPA 230 of the client IHS 205 may notify the IPv6 VIPA 230 of the client IHS 205 that the transmission of the request to initiate connection from the IPv6 VIPA 230 of the client IHS 205 to the IPv6 VIPA 245 of the server IHS 210 was successful. In response to receiving the acknowledgement from the IPv6 VIPA 245 of the server IHS 210, the IPv6 VIPA 230 of the client IHS 205 may transmit an acknowledgement to the IPv6 VIPA 230 of the server IHS 210. The acknowledgement sent by the IPv6 VIPA 230 of the client IHS 205 to the IPv6 VIPA 245 of the server IHS 210 may notify the IPv6 VIPA 245 of the server IHS 210 that the transmission of the acknowledgement from the IPv6 VIPA 245 of the server IHS 210 to the IPv6 VIPA 230 of the client IHS 205 was successful.

With the handshake complete, the IPv6 VIPA 230 of the client IHS 205 may establish communication to the IPv6 VIPA 245 of the server IHS 210. In this case, the IPv6 VIPA 230 of the client IHS 205 is at one end of the connection and the IPv6 VIPA 245 of the server IHS 210 at the other end of the connection. Thus, in this embodiment, the IPv6 VIPA 230 of the client IHS 205 and the IPv6 VIPA 210 of the server IHS 210 are each an endpoint of the established connection between the client IHS 205 and the server IHS 210. The IPv6 VIPA 230 of the client IHS 205 is the client endpoint, and the IPv6 VIPA 245 of the server IHS 210 is the server endpoint, for the established connection over network 215. The client endpoint may transmit data that the server endpoint may receive and similarly, the server endpoint may transmit data that the client endpoint may receive.

In one embodiment, the client endpoint may transmit an SMC-R proposal message to the server endpoint. The SMC-R proposal message may include a list of prefixes utilized by the network 215 that couples to the NIC 225 of the client IHS 205 to which the IPv6 global address 225 and IPv6 link local address 226 are associated. In one embodiment, the list of prefixes includes IPv6 prefix address 9:1:1::/64 of the network 215 that couples to the NIC 225 of the client IHS 205 to which the IPv6 global address 225 is associated. The server endpoint may receive the SMC-R proposal message from the client endpoint. The server endpoint may then compare the list of prefixes from the SMC-R proposal message to the IPv6 prefix 9:1:1::/64 of the network 215 that couples to the NIC 235 of the server IHS 210 to which the IPv6 global address 240 and IPv6 link local address 241 are associated.

If any of the prefixes utilized by the network 215 that couples to the NIC 235 of the server IHS 210 to which the IPv6 global address 240 and IPv6 link local address 241 are associated match any prefixes in the list of prefixes sent by the client endpoint in the SMC-R proposal message, the connection qualifies to use an RDMA protocol such as the SMC-R protocol. In another embodiment, IPv6 global address 240 exhibits an address of 9:1:1::2. The list of prefixes sent by the client endpoint in the SMC-R proposal message includes prefix 9:1:1::/64 of network 215. Since IPv6 global address 240 exhibits an address of 9:1:1::2, within the IPv6 prefix 9:1:1::/64 of network 215, the connection qualifies.

If the connection qualifies, the connection is suitable for transmitting information using the SMC-R protocol and the server endpoint may transmit an SMC-R accept message to the client endpoint. Upon receipt of the SMC-R accept message from the server endpoint, the client endpoint may transmit a SMC-R confirm message to the server endpoint. The server endpoint may receive the SMC-R confirm message from the client endpoint. With the handshake complete, the server endpoint and client endpoint may establish a connection utilizing the SMC-R protocol.

If none of the prefixes utilized by the network 215 that couples to the NIC 235 of the server IHS 210 to which the IPv6 global address 240 and the IPv6 link local address 241 are associated match any prefixes in the list of prefixes sent by the client endpoint in the SMC-R proposal message, the connection does not qualify to use an RDMA protocol such as the SMC-R protocol. In one embodiment, IPv6 global address 240 may exhibit an address of 9:1:2::2 (not shown). Since IPv6 global address 240 exhibits an address of 9:1:2::2, not within the IPv6 prefix 9:1:1::/64 of network 215, and no other prefixes utilized by the network 215 that couples to the NIC 235 of the server IHS 210 to which the IPv6 global address 240 and the IPv6 link local address 241 are associated match any prefixes in the list of prefixes sent by the client endpoint in the SMC-R proposal message, the connection does not qualify. In that case, the server endpoint may transmit an SMC-R decline message to the client endpoint. The SMC-R decline message may include "no prefixes match" as the reason for the failure to qualify.

Figure 3:
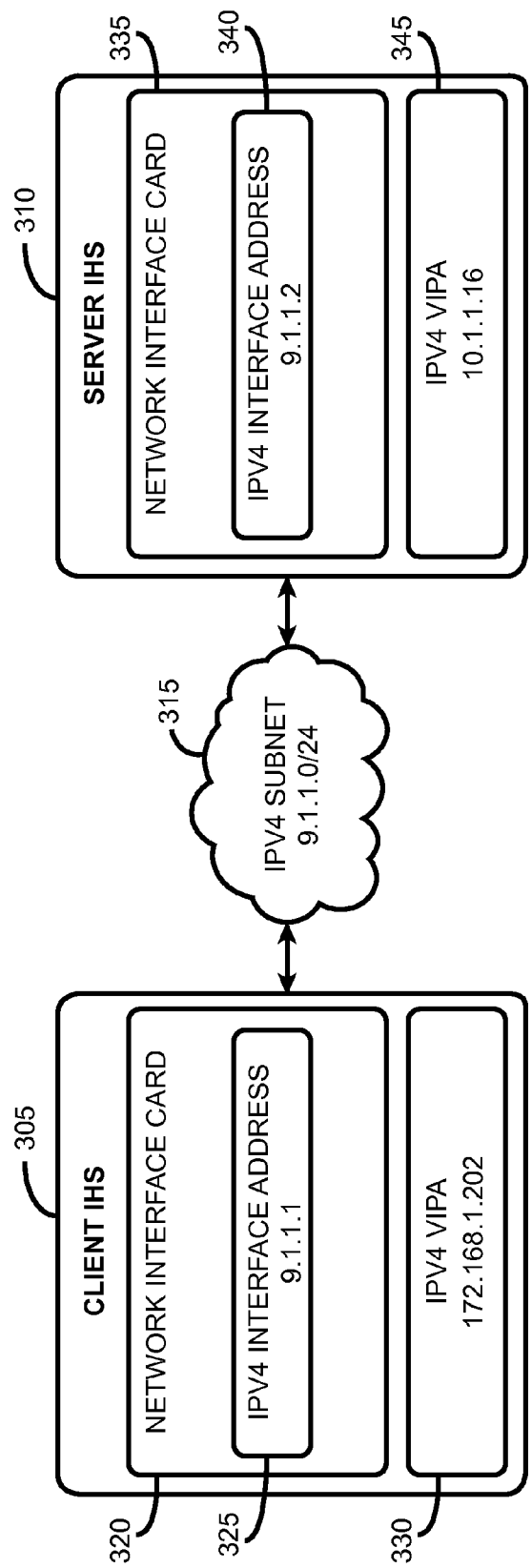
FIG. 3 is a block diagram showing yet another embodiment of the disclosed communication system.

FIG. 3 is a block diagram showing yet another embodiment of the disclosed communication system 300. Client IHS 305 may include a network interface card (NIC) 320 that couples by wire or wirelessly to network 315. In one embodiment, network 315 is an IPv4 subnet with the address 9.1.1.0/24. The IPv4 interface address 325 of NIC 320 may be address 9.1.1.1. The IPv4 interface address 325 falls in the range of 9.1.1.0 to 9.1.1.255 of subnet 9.1.1.0/24 of network 315, and thus the IPv4 interface address 325 is in the subnet 9.1.1.0/24 of network 315.

The IPv4 VIPA 330 of client IHS 305 may be address 172.168.1.202. The IPv4 VIPA 330 falls outside of the range of 9.1.1.0 to 9.1.1.255 of subnet 9.1.1.0/24 of network 315, and thus the IPv4 VIPA 330 is not in the subnet 9.1.1.0/24 of network 315.

Server IHS 310 may include a network interface card (NIC) 335 that couples by wire or wirelessly to network 315. The IPv4 interface address 340 of NIC 335 may be address 9.1.1.2. The IPv4 interface address 340 falls in the range of 9.1.1.0 to 9.1.1.255 of subnet 9.1.1.0/24 of network 315, and thus the IPv4 interface address 340 is in the subnet 9.1.1.0/24 of network 315.

The IPv4 VIPA 345 of server IHS 315 may be address 10.1.1.16. The IPv4 VIPA 345 falls outside of the range of 9.1.1.0 to 9.1.1.255 of subnet 9.1.1.0/24 of network 315, and thus the IPv4 VIPA 345 is not in the subnet 9.1.1.0/24 of network 115.

In communication system 300 that employs IPv4, IPv4 interface address 325 and IPv4 interface address 340 share the same subnet 9.1.1.0/24 of network 115. IPv4 VIPA 330 of the client IHS 305 may perform a handshake to attempt to establish a connection to the server IHS 310 via the network 315. To do this, the client IHS 305 may transmit a request from the IPv4 VIPA 330 of the client IHS 305 to the IPv4 VIPA 345 of the server IHS 310 to initiate connection from the client IHS 305 to the server IHS 310. The request to initiate connection from the IPv4 VIPA 330 of the client IHS 305 may also indicate to the server IHS 310 that the client IHS 305 may utilize a particular protocol to communicate with server IHS 310 after the IPv4 VIPA 330 of the client IHS 305 and IPv4 VIPA 345 of the server IHS 310 establish a connection. In one embodiment, communication system 300 establishes a TCP/IP connection between IPv4 VIPA 330 of client IHS 305 and IPv4 VIPA 345 of server IHS 310.

Figure 4:
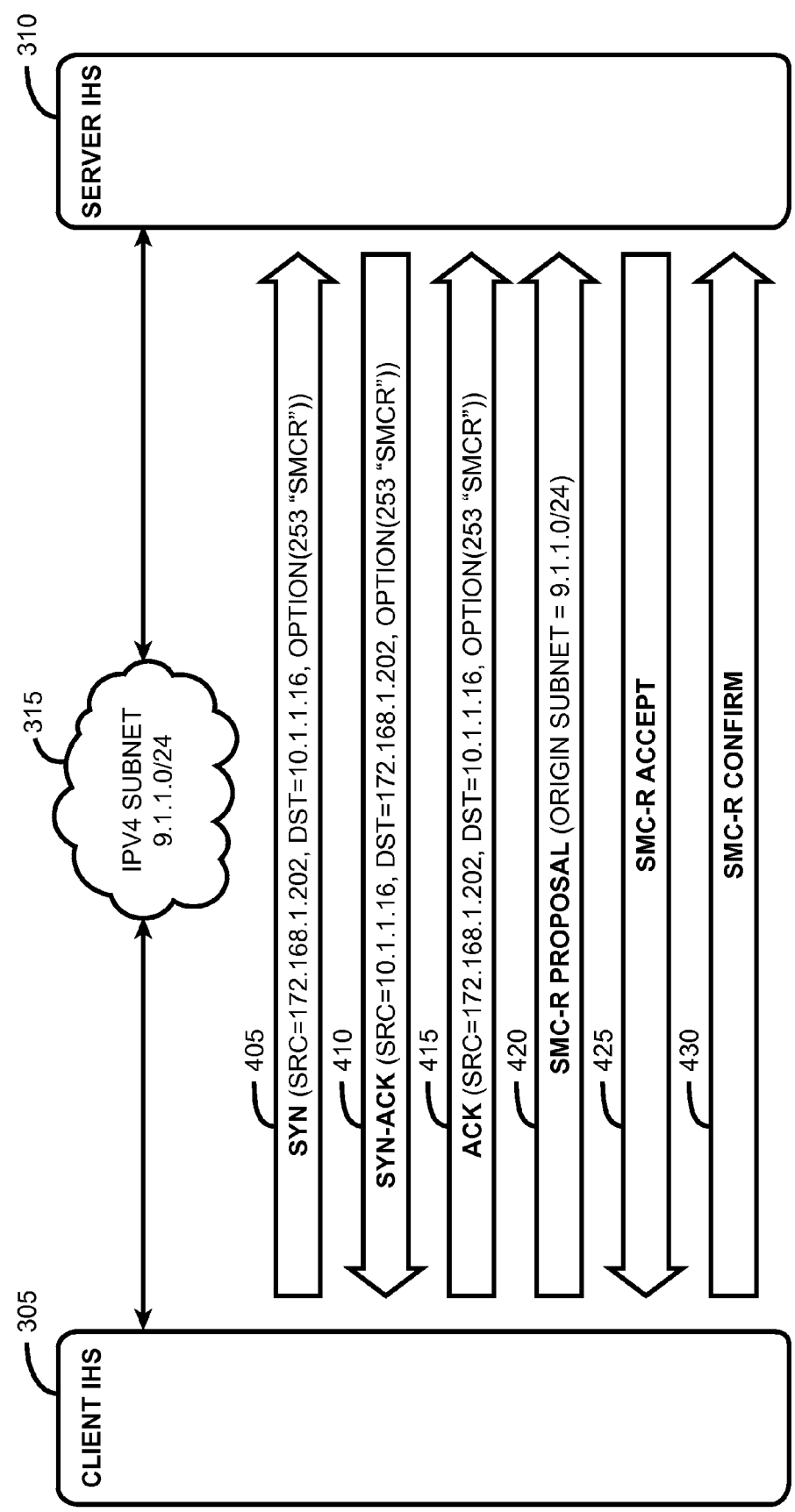
FIG. 4 depicts a communication system showing a representative sequence of communications that the disclosed communications methodology may employ.

FIG. 4 depicts communication system 300 showing a representative sequence of communications that the disclosed communications methodology may employ. When comparing FIG. 4 with FIG. 3, like numbers indicate like elements. To establish a TCP connection between IPv4 VIPA 330 of the client IHS 305 and the IPv4 VIPA 345 of the server IHS 310, the VIPA 330 of client IHS 305 may first transmit a SYN packet 405 to the VIPA 345 of server IHS 310 via network 315. To complete the route from IPv4 VIPA 330 to IPv4 VIPA 345, SYN packet 405 may travel from the IPv4 VIPA 330, to the client IHS 305, to the NIC 320, to IPv4 interface address 325, to the IPv4 subnet 9.1.1.0/24 of network 315, to IPv4 interface address 340, to NIC 335 and to server IHS 310, finally arriving at IPv4 VIPA 345. The SYN packet 405 may include the source IPv4 address 172.168.1.202, the destination IPv4 address 10.1.1.16 and the option 253 indicating that a SMC-R proposal message will follow the establishment of the TCP connection.

The IPv4 VIPA 345 of server IHS 310 may acknowledge the receipt of the SYN packet 405 by transmitting a SYN-ACK packet 410 to the VIPA 330 of client IHS 310. The SYN-ACK packet 410 may travel from IPv4 VIPA 345 to server IHS 310, to NIC 335, to IPv4 interface address 340, to the IPv4 subnet 9.1.1.0/24 of network 315, to IPv4 interface address 325, to NIC 320 and to client IHS 305, finally arriving at IPv4 VIPA 330. The SYN-ACK packet 410 may include the source IPv4 address 10.1.1.16, the destination IPv4 address 172.168.1.202 and the option 253 indicating that a SMC-R proposal message will follow the establishment of the TCP connection.

The IPv4 VIPA 330 of client IHS 305 may acknowledge the receipt of the SYN-ACK packet 410 by transmitting an ACK packet 415 to the VIPA 345 of server IHS 310. The ACK packet 410 may travel from the IPv4 VIPA 330, to the client IHS 305, to the NIC 320, to IPv4 interface address 325, to the IPv4 subnet 9.1.1.0/24 of network 315, to IPv4 interface address 340, to NIC 335 and to server IHS 310, finally arriving at IPv4 VIPA 345. The ACK packet 415 may include the source IPv4 address 172.168.1.202, the destination IPv4 address 10.1.1.16 and the option 253 indicating that a SMC-R proposal message will follow the establishment of the TCP connection. With a successful handshake, the IPv4 VIPA 330 of the client IHS 305 establishes a connection to the IPv4 VIPA 345 of the server IHS 310 at one end of the connection and the IPv4 VIPA 330 of the client IHS 305 at the other end of the connection, thus enabling the IPv4 VIPA 330 to communicate to the IPv4 VIPA 345 via the network 315.

Thus, in this embodiment, the IPv4 VIPA 330 of the client IHS 305 and the IPv4 VIPA 310 of the server IHS 310 are each an endpoint of the established connection between the client IHS 305 and the server IHS 310. The IPv4 VIPA 330 of the client IHS 305 is the client endpoint, and the IPv4 VIPA 345 of the server IHS 310 is the server endpoint for the established connection over network 315. The client endpoint may transmit data that the server endpoint may receive and similarly, the server endpoint may transmit data that the client endpoint may receive.

In one embodiment, the client endpoint may transmit an SMC-R proposal message 420 to the server endpoint. The SMC-R proposal message 420 may travel from the IPv4 VIPA 330, to the client IHS 305, to the NIC 320, to IPv4 interface address 325, to the IPv4 subnet 9.1.1.0/24 of network 315, to IPv4 interface address 340, to NIC 335 and to server IHS 310, finally arriving at IPv4 VIPA 345. The SMC-R proposal message 420 may include subnet information, i.e., the subnet of the origin NIC, i.e. NIC 320, of the SMC-R proposal message 420, IPv4 subnet 9.1.1.0/24 of network 315.

If the IPv4 subnet address 9.1.1.0/24 of the network 315 that the IPv4 interface address 340 associated with the NIC 335 of the server IHS 310 connects to is the same as the subnet information sent by the client endpoint in the SMC-R proposal message, the connection qualifies. In another embodiment, if the IPv4 interface address 340 associated with the NIC 335 of the server IHS 310 is in the same subnet as the subnet information sent by the client endpoint in the SMC-R proposal message, the connection qualifies. For example, IPv4 interface address 340 exhibits an address of 9.1.1.2. IPv4 subnet 9.1.1.0/24 of network 315 spans the range of addresses from 9.1.1.0 to 9.1.1.255. Since IPv4 interface address 340 exhibits an address of 9.1.1.2, within the IPv4 subnet 9.1.1.0/24 of network 315, the connection qualifies.

The server endpoint may acknowledge that the connection qualifies, i.e., the connection may communicate utilizing the SMC-R protocol, by transmitting a SMC-R accept message 425 to the client endpoint. The SMC-R accept message 425 may travel from IPv4 VIPA 345 to server IHS 310, to NIC 335, to IPv4 interface address 340, to the IPv4 subnet 9.1.1.0/24 of network 315, to IPv4 interface address 325, to NIC 320 and to client IHS 305, finally arriving at IPv4 VIPA 330. The SMC-R accept message 425 may include an indication that the connection qualifies and that a connection utilizing the SMC-R protocol be established.

The client endpoint may confirm the receipt of the SMC-R accept message 425 by transmitting an SMC-R confirm message 430 to the server endpoint. The SMC-R confirm message 430 may travel from the IPv4 VIPA 330, to the client IHS 305, to the NIC 320, to IPv4 interface address 325, to the IPv4 subnet 9.1.1.0/24 of network 315, to IPv4 interface address 340, to NIC 335 and to server IHS 310, finally arriving at IPv4 VIPA 345. The SMC-R confirm message 430 may include an indication that the connection qualifies and that a connection utilizing the SMC-R protocol be established. With a successful SMC-R handshake, the IPv4 VIPA 330 of the client IHS 305 establishes a SMC-R connection the IPv4 VIPA 345 of the server IHS 310 at one end of the connection and the IPv4 VIPA 330 of the client IHS 305 at the other end of the connection, thus enabling the IPv4 VIPA 330 to communicate to the IPv4 VIPA 345 via the network 315 utilizing the SMC-R protocol.

Figure 5:
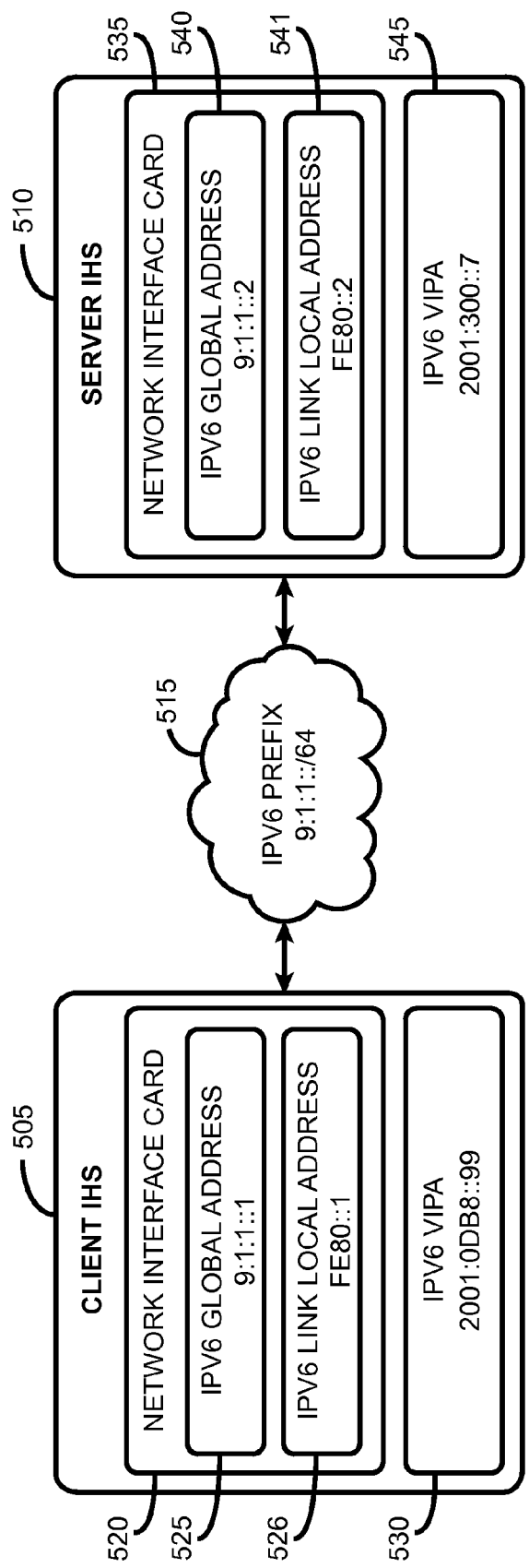
FIG. 5 is a block diagram showing still another embodiment of the disclosed communication system.

FIG. 5 is a block diagram showing still another embodiment of the disclosed communication system 500. Client IHS 505 may include a network interface card (NIC) 520 that couples by wire or wirelessly to network 515. In one embodiment, network 515 is an IPv6 prefix with the address 9:1:1::0/64. The IPv6 global address 525 of NIC 520 exhibits address 9:1:1::1. The IPv6 link local address 526 of NIC 520 exhibits address FE80::1. The IPv6 global address 525 falls in the range of prefix 9:1:1::/64 of network 515, and thus the IPv6 global address 525 is in the prefix 9:1:1::/64 of network 515.

The IPv6 VIPA 530 of client IHS 505 may be address 2001:0DB8::99. The IPv6 VIPA 530 does not fall in the range of prefix 9:1:1::/64 of network 515, and thus the IPv6 VIPA 530 is not in the prefix 9:1:1::/64 of network 515.

Server IHS 510 may include a network interface card (NIC) 535 that couples by wire or wirelessly to network 515. The IPv6 global address 540 of NIC 535 may be address 9:1:1::2. The IPv6 link local address 541 of NIC 520 exhibits address FE80::2. The IPv6 interface address 540 falls in the range of prefix 9:1:1::/64 of network 515, and thus the IPv6 interface address 540 is in the prefix 9:1:1::/64 of network 515.

The IPv6 VIPA 545 of server IHS 510 exhibits address 2001:300::7. The IPv6 VIPA 545 does not fall in the range of prefix 9:1:1::/64 of network 515, and thus the IPv6 VIPA 545 is not in the prefix 9:1:1::/64 of network 515.

In communication system 500 that employs IPv6, IPv6 global address 525 and IPv6 global address 540 share the same prefix 9:1:1::/64 of network 515. IPv6 VIPA 530 of the client IHS 505 may perform a handshake to attempt to establish a connection to the server IHS 510 via the network 515. To do this, the client IHS 505 may transmit a request from the IPv6 VIPA 530 of the client IHS 505 to the IPv6 VIPA 545 of the server IHS 510 to initiate connection from the client IHS 505 to the server IHS 510. The request to initiate connection from the IPv6 VIPA 530 of the client IHS 505 may also indicate to the server IHS 510 that the client IHS 505 may utilize a particular protocol to communicate with server IHS 510 after the IPv6 VIPA 530 of the client IHS 505 and IPv6 VIPA 545 of the server IHS 510 establish a connection. In one embodiment, communication system 500 establishes a TCP/IP connection between IPv6 VIPA 530 of client IHS 505 and IPv6 VIPA 545 of server IHS 510.

Figure 6:
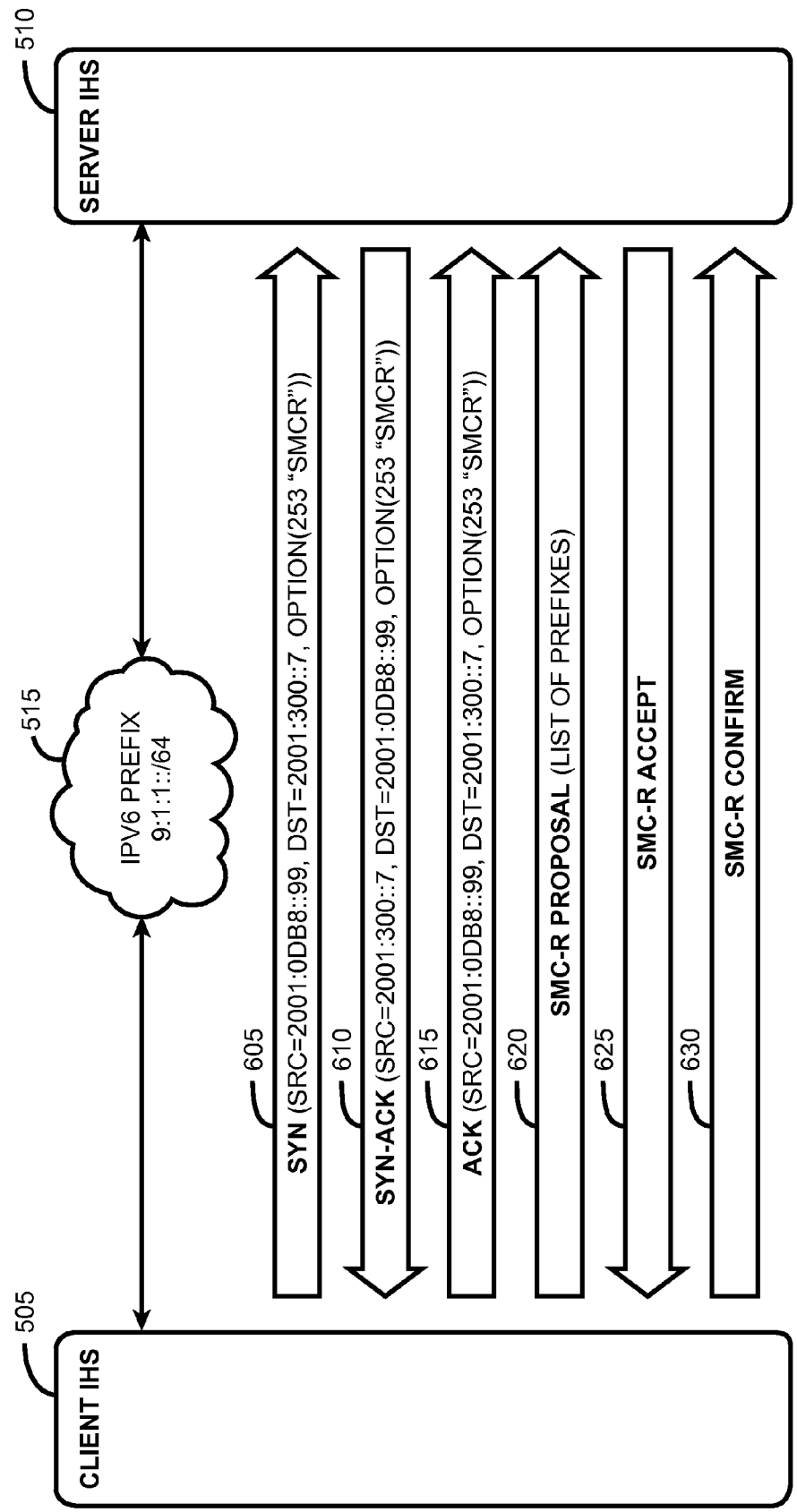
FIG. 6 depicts a communication system showing a representative sequence of communications that the disclosed communications methodology may employ.

FIG. 6 depicts communication system 500 showing a representative sequence of communications that the disclosed communications methodology may employ. When comparing FIG. 6 with FIG. 4, like numbers indicate like elements. To establish a TCP connection between IPv6 VIPA 530 of the client IHS 505 and the IPv6 VIPA 545 of the server IHS 510, the IPv6 VIPA 530 of client IHS 505 may first transmit a SYN packet 605 to the VIPA 545 of server IHS 510 via network 515. To complete the route from IPv6 VIPA 530 to IPv6 VIPA 545, SYN packet 605 may travel from the IPv6 VIPA 530, to the client IHS 505, to the NIC 520, to IPv4 global address 525, to the IPv6 prefix 9:1:1::/64 of network 515, to IPv6 global address 540, to NIC 535 and to server IHS 510, finally arriving at IPv6 VIPA 545. The SYN packet 605 may include the source IPv6 address 2001:0 DB8::99, the destination IPv6 address 2001:300::7 and the option 253 indicating that a SMC-R proposal message will follow the establishment of the TCP connection.

The IPv6 VIPA 545 of server IHS 510 may acknowledge the receipt of the SYN packet 605 by transmitting a SYN-ACK packet 610 to the VIPA 530 of client IHS 510. The SYN-ACK packet 610 may travel from IPv6 VIPA 545 to server IHS 510, to NIC 535, to IPv6 global address 540, to the IPv6 prefix 9:1:1::/64 of network 515, to IPv6 global address 525, to NIC 520 and to client IHS 505, finally arriving at IPv6 VIPA 530. The SYN-ACK packet 610 may include the source IPv6 address 2001:300::7, the destination IPv6 address 2001:0 DB8::99 and the option 253 indicating that a SMC-R proposal message will follow the establishment of the TCP connection.

The IPv6 VIPA 530 of client IHS 505 may acknowledge the receipt of the SYN-ACK packet 610 by transmitting an ACK packet 615 to the VIPA 545 of server IHS 510. The ACK packet 610 may travel from the IPv6 VIPA 530, to the client IHS 505, to the NIC 520, to IPv6 global address 525, to the IPv6 prefix 9:1:1::/64 of network 515, to IPv6 global address 540, to NIC 535 and to server IHS 510, finally arriving at IPv6 VIPA 545. The ACK packet 615 may include the source IPv6 address 2001:0 DB8::99, the destination IPv6 address 2001:300::7 and the option 253 indicating that a SMC-R proposal message will follow the establishment of the TCP connection. With a successful handshake, the IPv6 VIPA 530 of the client IHS 505 establishes a connection to the IPv6 VIPA 545 of the server IHS 510 at one end of the connection and the IPv6 VIPA 530 of the client IHS 505 at the other end of the connection, thus enabling the IPv6 VIPA 530 to communicate to the IPv6 VIPA 545 via the network 515.

Thus, in this embodiment, the IPv6 VIPA 530 of the client IHS 505 and the IPv6 VIPA 510 of the server IHS 510 are each an endpoint of the established connection between the client IHS 505 and the server IHS 510. The IPv6 VIPA 530 of the client IHS 505 is the client endpoint, and the IPv6 VIPA 545 of the server IHS 510 is the server endpoint for the established connection over network 515. The client endpoint may transmit data that the server endpoint may receive and similarly, the server endpoint may transmit data that the client endpoint may receive.

In one embodiment, the client endpoint may transmit an SMC-R proposal message 620 to the server endpoint. The SMC-R proposal message 620 may travel from the IPv6 VIPA 530, to the client IHS 505, to the NIC 520, to IPv6 global address 525, to the IPv6 prefix 9:1:1::/64 of network 515, to IPv6 global address 540, to NIC 535 and to server IHS 510, finally arriving at IPv6 VIPA 545. The SMC-R proposal message 620 may include a list of prefixes utilized by the network 515 that couples to the NIC 525 of the client IHS 505 to which the IPv6 global address 525 and IPv6 link local address 526 are associated. In one embodiment, the list of prefixes includes IPv6 prefix address 9:1:1::/64 of the network 515 that couples to the NIC 525 of the client IHS 505 to which the IPv6 global address 525 is associated.

If any of the prefixes utilized by the network 515 that couples to the NIC 535 of the server IHS 510 to which the IPv6 global address 540 and IPv6 link local address 541 are associated match any prefixes in the list of prefixes sent by the client endpoint in the SMC-R proposal message, the connection qualifies to use an RDMA protocol such as the SMC-R protocol. In another embodiment, IPv6 global address 540 exhibits an address of 9:1:1::2. The list of prefixes sent by the client endpoint in the SMC-R proposal message includes prefix 9:1:1::/64 of network 515. Since IPv6 global address 540 exhibits an address of 9:1:1::2, within the IPv6 prefix 9:1:1::/64 of network 515, the connection qualifies.

The server endpoint may acknowledge that the connection qualifies, i.e., the connection may communicate utilizing the SMC-R protocol, by transmitting a SMC-R accept message 625 to the client endpoint. The SMC-R accept message 625 may travel from IPv6 VIPA 545 to server IHS 510, to NIC 535, to IPv6 global address 540, to the IPv6 prefix 9:1:1::/64 of network 515, to IPv6 global address 525, to NIC 520 and to client IHS 505, finally arriving at IPv6 VIPA 530. The SMC-R accept message 625 may include an indication that the connection qualifies and that a connection utilizing the SMC-R protocol be established.

The client endpoint may confirm the receipt of the SMC-R accept message 625 by transmitting an SMC-R confirm message 630 to the server endpoint. The SMC-R confirm message 630 may travel from the IPv6 VIPA 530, to the client IHS 505, to the NIC 520, to IPv6 global address 525, to the IPv6 prefix 9:1:1::/64 of network 515, to IPv6 global address 540, to NIC 535 and to server IHS 510, finally arriving at IPv6 VIPA 545. The SMC-R confirm message 630 may include an indication that the connection qualifies and that a connection utilizing the SMC-R protocol be established. With a successful SMC-R handshake, the IPv6 VIPA 530 of the client IHS 505 establishes a SMC-R connection the IPv6 VIPA 545 of the server IHS 510 at one end of the connection and the IPv6 VIPA 530 of the client IHS 505 at the other end of the connection, thus enabling the IPv6 VIPA 530 to communicate to the IPv6 VIPA 545 via the network 515 utilizing the SMC-R protocol.

Figure 7:
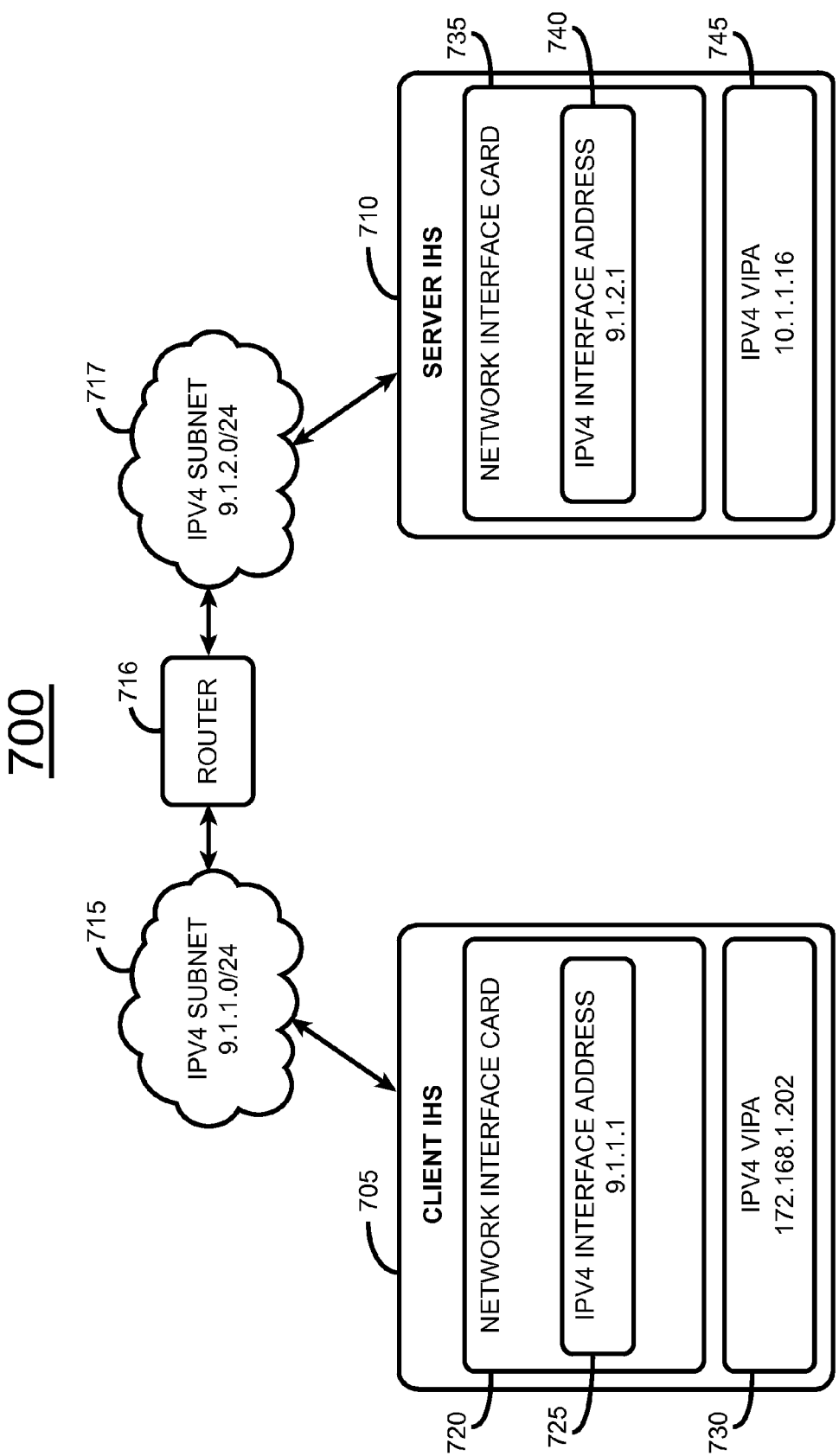
FIG. 7 is a block diagram showing another embodiment of the disclosed communication system.

FIG. 7 is a block diagram showing another embodiment of the disclosed communication system 700. Client IHS 705 may include a network interface card (NIC) 720 that couples by wire or wirelessly to network 715. In one embodiment, network 715 is an IPv4 subnet with the address 9.1.1.0/24. The IPv4 interface address 725 of NIC 720 may be address 9.1.1.1. The IPv4 interface address 725 falls in the range of 9.1.1.0 to 9.1.1.255 of subnet 9.1.1.0/24 of network 715, and thus the IPv4 interface address 725 is in the subnet 9.1.1.0/24 of network 715.

The IPv4 VIPA 730 of client IHS 705 may be address 172.168.1.202. The IPv4 VIPA 730 falls outside of the range of 9.1.1.0 to 9.1.1.255 of subnet 9.1.1.0/24 of network 715, and thus the IPv4 VIPA 330 is not in the subnet 9.1.1.0/24 of network 715.

Server IHS 710 may include a network interface card (NIC) 735 that couples by wire or wirelessly to network 717. The IPv4 interface address 740 of NIC 735 may be address 9.1.2.1. The IPv4 interface address 740 falls in the range of 9.1.2.0 to 9.1.2.255 of subnet 9.1.2.0/24 of network 717, and thus the IPv4 interface address 740 is in the subnet 9.1.2.0/24 of network 717.

The IPv4 VIPA 745 of server IHS 710 may be address 10.1.1.16. The IPv4 VIPA 745 falls outside of the range of 9.1.2.0 to 9.1.2.255 of subnet 9.1.2.0/24 of network 717, and thus the IPv4 VIPA 745 is not in the subnet 9.1.2.0/24 of network 717.

Network 715 couples to network 717 via a router 716. Client IHS 705 and server IHS 710 are on different network segments, separated by router 716. Router 716 may be transparent to the client IHS 705 and the server IHS 710. If client IHS 705 transmits information over network 715 to server IHS 710, the router 716 will collect the information. The router 716 will retransmit the information sent from client IHS 705 to server IHS 710 over network 717 to server IHS 710. Similarly, if server IHS 710 transmits information over network 717 to client IHS 705, the router 716 will collect the information. The router 716 will retransmit the information sent from server IHS 710 to client IHS 705 over network 715 to client IHS 705.

In communication system 700 that employs IPv4, IPv4 interface address 725 and IPv4 interface address 740 do not share subnet 9.1.1.0/24 of network 715 or subnet 9.1.2.0/24 of network 717. IPv4 VIPA 730 of the client IHS 705 may perform a handshake to attempt to establish a connection to the server IHS 710 via the network 715. To do this, the client IHS 705 may transmit a request from the IPv4 VIPA 730 of the client IHS 705 to the IPv4 VIPA 745 of the server IHS 710 to initiate connection from the client IHS 705 to the server IHS 710. The request to initiate connection from the IPv4 VIPA 730 of the client IHS 705 may also indicate to the server IHS 710 that the client IHS 705 may utilize a particular protocol to communicate with server IHS 710 after the IPv4 VIPA 730 of the client IHS 705 and IPv4 VIPA 745 of the server IHS 710 establish a connection. In one embodiment, communication system 700 establishes a TCP/IP connection between IPv4 VIPA 730 of client IHS 705 and IPv4 VIPA 745 of server IHS 710.

Figure 8:
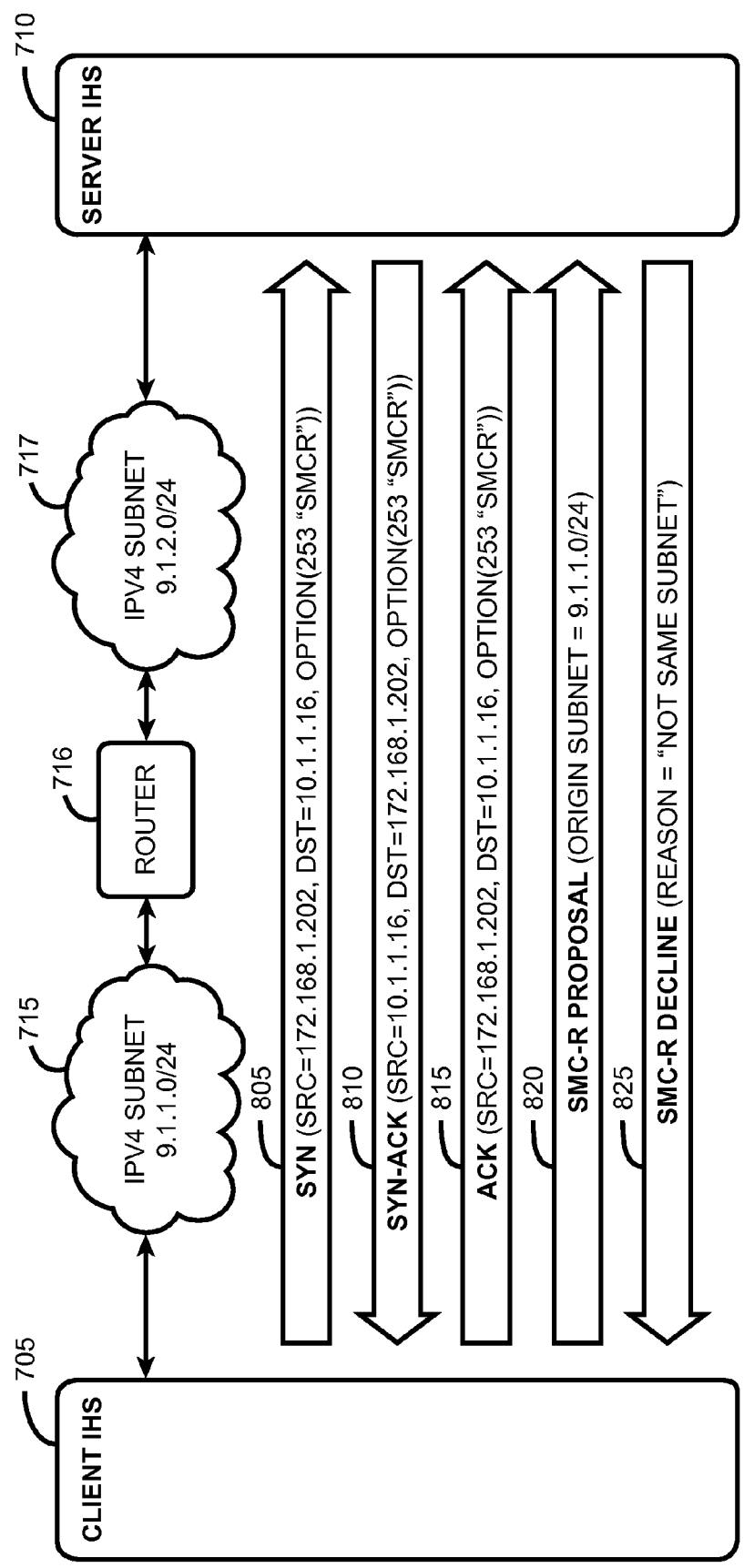
FIG. 8 depicts a communication system showing a representative sequence of communications that the disclosed communications methodology may employ.

FIG. 8 depicts communication system 700 showing a representative sequence of communications that the disclosed communications methodology may employ. When comparing FIG. 8 with FIG. 7, like numbers indicate like elements. To establish a TCP connection between IPv4 VIPA 730 of the client IHS 705 and the IPv4 VIPA 745 of the server IHS 710, the VIPA 730 of client IHS 705 may first transmit a SYN packet 805 to the VIPA 745 of server IHS 710 via network 715. To complete the route from IPv4 VIPA 730 to IPv4 VIPA 745, SYN packet 805 may travel from the IPv4 VIPA 730, to the client IHS 705, to the NIC 720, to IPv4 interface address 725, to the IPv4 subnet 9.1.1.0/24 of network 715, to router 716, to IPv4 subnet 9.1.2.0/24 of network 717, to IPv4 interface address 740, to NIC 735 and to server IHS 710, finally arriving at IPv4 VIPA 745. The SYN packet 805 may include the source IPv4 address 172.168.1.202, the destination IPv4 address 10.1.1.16 and the option 253 indicating that a SMC-R proposal message will follow the establishment of the TCP connection.

The IPv4 VIPA 745 of server IHS 710 may acknowledge the receipt of the SYN packet 805 by transmitting a SYN-ACK packet 810 to the VIPA 730 of client IHS 710. The SYN-ACK packet 810 may travel from IPv4 VIPA 745 to server IHS 710, to NIC 735, to IPv4 interface address 740, IPv4 subnet 9.1.2.0/24 of network 717, to router 716, to the IPv4 subnet 9.1.1.0/24 of network 715, to IPv4 interface address 725, to NIC 720 and to client IHS 705, finally arriving at IPv4 VIPA 730. The SYN-ACK packet 810 may include the source IPv4 address 10.1.1.16, the destination IPv4 address 172.168.1.202 and the option 253 indicating that a SMC-R proposal message will follow the establishment of the TCP connection.

The IPv4 VIPA 730 of client IHS 705 may acknowledge the receipt of the SYN-ACK packet 810 by transmitting an ACK packet 815 to the VIPA 745 of server IHS 710. The ACK packet 810 may travel from the IPv4 VIPA 730, to the client IHS 705, to the NIC 720, to IPv4 interface address 725, to the IPv4 subnet 9.1.1.0/24 of network 715, to router 716, to IPv4 subnet 9.1.2.0/24 of network 717, to IPv4 interface address 740, to NIC 735 and to server IHS 710, finally arriving at IPv4 VIPA 745. The ACK packet 815 may include the source IPv4 address 172.168.1.202, the destination IPv4 address 10.1.1.16 and the option 253 indicating that a SMC-R proposal message will follow the establishment of the TCP connection. With a successful handshake, the IPv4 VIPA 730 of the client IHS 705 establishes a connection to the IPv4 VIPA 745 of the server IHS 710 at one end of the connection and the IPv4 VIPA 730 of the client IHS 705 at the other end of the connection, thus enabling the IPv4 VIPA 730 to communicate to the IPv4 VIPA 745 via the network 715.

Thus, in this embodiment, the IPv4 VIPA 730 of the client IHS 705 and the IPv4 VIPA 710 of the server IHS 710 are each an endpoint of the established connection between the client IHS 705 and the server IHS 710. The IPv4 VIPA 730 of the client IHS 705 is the client endpoint, and the IPv4 VIPA 745 of the server IHS 710 is the server endpoint for the established connection over network 715. The client endpoint may transmit data that the server endpoint may receive and similarly, the server endpoint may transmit data that the client endpoint may receive.

In one embodiment, the client endpoint may transmit an SMC-R proposal message 820 to the server endpoint. The SMC-R proposal message 820 may travel from the IPv4 VIPA 730, to the client IHS 705, to the NIC 720, to IPv4 interface address 725, to the IPv4 subnet 9.1.1.0/24 of network 715, to router 716, to IPv4 subnet 9.1.2.0/24 of network 717, to IPv4 interface address 740, to NIC 735 and to server IHS 710, finally arriving at IPv4 VIPA 745. The SMC-R proposal message 820 may include subnet information, i.e., the subnet of the origin NIC, i.e. NIC 720, of the SMC-R proposal message 820, IPv4 subnet 9.1.1.0/24 of network 715.

Since the IPv4 subnet address 9.1.2.0/24 of the network 717 that the IPv4 interface address 740 associated with the NIC 735 of the server IHS 710 connects to is not the same as the subnet information sent by the client endpoint in the SMC-R proposal message, the connection does not qualify. In another embodiment, since the IPv4 interface address 740 associated with the NIC 735 of the server IHS 710 is not in the same subnet as the subnet information sent by the client endpoint in the SMC-R proposal message, the connection does not qualify. For example, IPv4 interface address 740 exhibits an address of 9.1.2.1. IPv4 subnet 9.1.1.0/24 of network 715 spans the range of addresses from 9.1.1.0 to 9.1.1.255. Since IPv4 interface address 740 exhibits an address of 9.1.2.1, not within the IPv4 subnet 9.1.1.0/24 of network 715, the connection does not qualify.

The server endpoint may acknowledge that the connection does not qualify, i.e., that the connection may not communicate utilizing the SMC-R protocol, by transmitting a SMC-R decline message 825 to the client endpoint. The SMC-R decline message 825 may travel from IPv4 VIPA 745 to server IHS 710, to NIC 735, to IPv4 interface address 740, to IPv4 subnet 9.1.2.0/24 of network 717, to router 716, to the IPv4 subnet 9.1.1.0/24 of network 715, to IPv4 interface address 725, to NIC 720 and to client IHS 705, finally arriving at IPv4 VIPA 730. The SMC-R decline message 825 may include an indication that the connection does not qualify and that a connection utilizing the SMC-R protocol be established with the reason "not same subnet".

Figure 9:
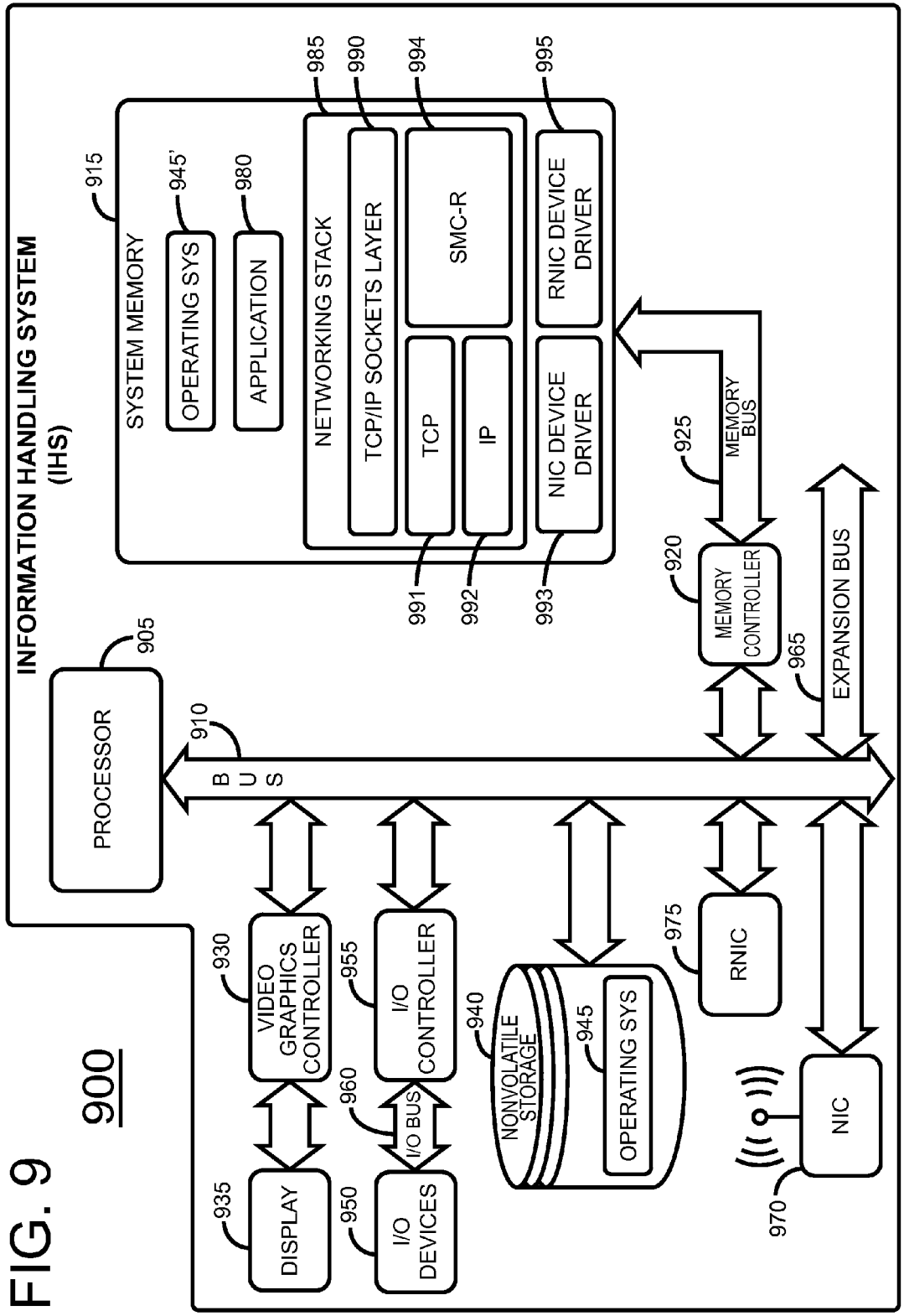
FIG. 9 is a block diagram of an information handling system (IHS) that may be used in the disclosed communication system.

FIG. 9 is a block diagram of an information handling system (IHS) 900 that may be used in the disclosed communication system. In one embodiment, IHS 900 may be representative of a client IHS. In another embodiment, IHS 900 may representative of a server IHS. IHS 900 includes a processor 905 that may include multiple cores. IHS 900 processes, transfers, communicates, modifies, stores or otherwise handles information in digital form, analog form or other form. IHS 900 includes a bus 910 that couples processor 905 to memory 915 via a memory controller 920 and memory bus 925. System memory 915 may also be referred to as main memory. System memory 915 may be a static random access memory (SRAM) array or a dynamic random access memory (DRAM) array. Processor 905 may also include local memory such as L1, L2 and L3 caches. A video graphics controller 930 couples display 935 to bus 910. Nonvolatile storage 940, such as a hard disk drive, solid-state drive (SSD), CD drive, DVD drive, or other nonvolatile storage couples to bus 910 to provide IHS 900 with permanent storage of information. System memory 915 and nonvolatile storage 940 are both forms of memory stores. Nonvolatile storage 940 stores an operating system 945 (OPERATING SYS) that governs operation of IHS 900. I/O devices 950, such as speakers, a keyboard and a pointing device, couple to bus 910 via I/O controller 955 and I/O bus 960.

One or more expansion busses 965, such as USB, IEEE 1394 bus, ATA, SATA, PCI, PCIE, DVI, HDMI and other busses, couple to bus 910 to facilitate the connection of peripherals and devices to IHS 900. A network interface controller (NIC) 970 couples to bus 910 to enable IHS 900 to connect by wire or wirelessly to a network and other information handling systems. NIC 970 may also be called a network communication adapter or a network adapter. A RDMA enabled NIC (RNIC) 975 couples to bus 910 to enable IHS 900 to connect by wire or wirelessly to a network and other information handling systems. RNIC 975 may also be called a RDMA enabled network communication adapter or a RDMA enabled network adapter. While FIG. 9 shows one IHS that employs processor 905, the IHS may take many forms. For example, IHS 900 may take the form of a desktop, portable, laptop, notebook, tablet or other form factor computer or data processing system. IHS 900 may take other form factors such as a gaming device, a personal digital assistant (PDA), a portable telephone device, a communication device or other devices that include a processor and memory.

In one embodiment, IHS 900 may store operating system 945 (OPERATING SYS) in nonvolatile storage 940. When IHS 900 initializes, the IHS loads operating system 945 into system memory 915 for execution as operating system 945'. In one embodiment, IHS 900 also loads application 900 into system memory 915 for execution. In another embodiment, IHS 900 also loads networking stack 985 into system memory 915 for execution. Network stack 985 may include the TCP/IP Sockets Layer 990, TCP 991, IP 992 and SMC-R 994. In another embodiment, Network stack 985, NIC device driver 993 and RNIC device driver 995 may be part of operating system 945 and loaded into system memory 915 for execution. In another embodiment, IHS 900 also loads NIC device driver 993 into system memory 915 for execution. In another embodiment, IHS 900 also loads RNIC device driver 995 into system memory 915 for execution.

In actual practice, a client IHS may communicate with a server IHS over a network in the following manner. From the viewpoint of the client IHS, application 980 utilizes the networking stack 985 to initiate a network connection between a client endpoint and a server endpoint by completing a TCP handshake between the client endpoint and the server endpoint. Networking stack 985 utilizes TCP/IP sockets layer 990 to select an appropriate socket. TCP 991 creates a TCP segment that is encapsulated in an IP datagram by IP 922. The NIC device driver 993 may process the TCP segment encapsulated in an IP datagram for transmission to the server endpoint by the NIC 970. After the completion of the TCP handshake, using the connection established above, the networking stack 985 may determine if a connection utilizing SMC-R between the client endpoint and the server endpoint is possible, i.e., if the connection qualifies. If an SMC-R connection is possible, an SMC-R connection is established between the client endpoint and the server endpoint. After the SMC-R confirmation handshake, i.e. the establishment of an SMC-R connection, the connection utilizes the RNIC device driver 995 and RNIC 975 to communicate by employing RDMA. The RNIC device driver 995 may process the message for transmission to the server endpoint. RNIC 975 may transmit the processed message to the server endpoint, thus communicating over the established network connection utilizing the RDMA protocol between the client endpoint and the server endpoint.

Figure 10:
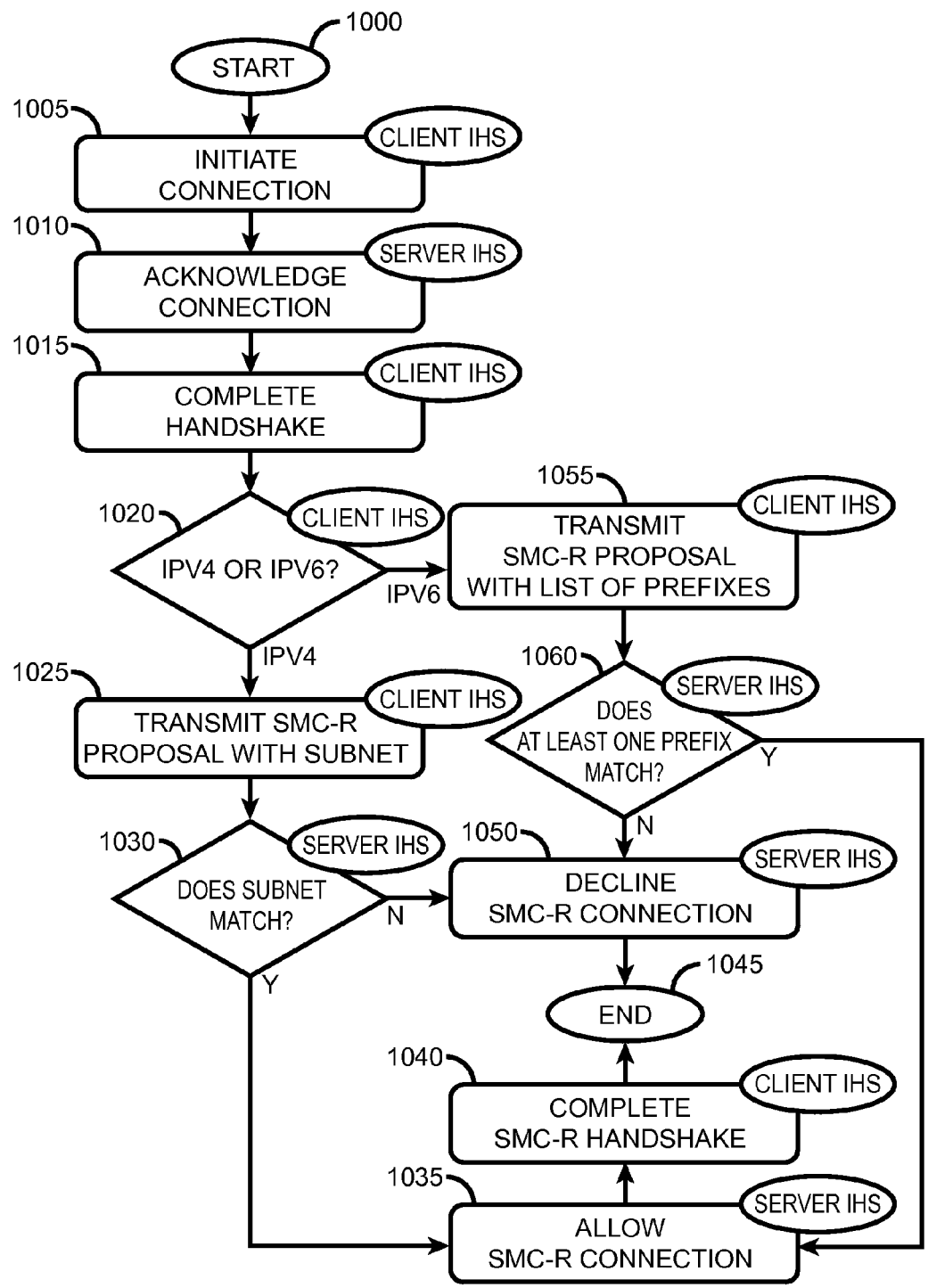
FIG. 10 is a flowchart that shows a representative process flow in one embodiment of the disclosed communications system.

FIG. 10 is a flowchart that shows a representative process flow in one embodiment of the disclosed communications system. Process flow commences when an application 980 in the client IHS instructs the client endpoint of the client to attempt to establish a connection with the server endpoint of the server IHS, via a network, as per block 1000. Responsive to the client application's connection request, the client endpoint of the client IHS may transmit a request from the client endpoint to the server endpoint of the server IHS to initiate connection from the client IHS to the server IHS, via the network, as per block 1005.

The request to initiate connection from the client endpoint may also indicate to the server endpoint that the client endpoint wants to utilize a particular protocol to communicate after the client endpoint of the client IHS and the server endpoint of the server IHS establish a connection. The server endpoint may respond to the client endpoint by acknowledging that the request to initiate connection was received by the server endpoint of the server IHS, as per block 1010. The client endpoint of the client IHS may then respond to the server endpoint that the acknowledgement of the request to initiate connection was received, thus completing the handshake, as per block 1015. With the handshake complete, the client endpoint may establish communication with the server endpoint. The client endpoint may transmit data that the server endpoint may receive and similarly, the server endpoint may transmit data that the client endpoint may receive.

If the IP address associated with the NIC of the client IHS is an IPv4 address, as per decision block 1020, the client IHS may transmit a SMC-R proposal message to the server endpoint. The SMC-R proposal message may include the subnet of the network that couples to the NIC of the client IHS to which the client's IP interface address is associated, as per block 1025. The server endpoint may receive the SMC-R proposal message from the client endpoint. The server endpoint may then compare the subnet of the network that couples to the NIC of the server IHS to which the server's IP interface address is associated to the subnet sent by the client endpoint in the SMC-R proposal message. If the subnet of the network that couples to the NIC of the server IHS to which the server's IP interface address is associated is the same as the subnet sent by the client endpoint in the SMC-R proposal message, the connection qualifies, as per decision block 1030. If the connection qualifies, the connection is suitable for transmitting information using the SMC-R protocol and the server endpoint may transmit a SMC-R accept message to the client endpoint, as per block 1035. Upon receipt of the SMC-R accept message from the server endpoint, the client endpoint may transmit a SMC-R confirm message to the server endpoint. The server endpoint may receive the SMC-R confirm message from the client endpoint, as per block 1040. With the handshake complete, the server endpoint and client endpoint may establish a connection utilizing the SMC-R protocol. Process flow terminates, as per block 1045.

If the subnet of the network that couples to the NIC of the server IHS to which the server's IP interface address is associated is not the same as the subnet sent by the client endpoint in the SMC-R proposal message, the connection does not qualify, as per decision block 1030. The server endpoint may transmit a SMC-R decline message to the client endpoint that may include reason for the failure to qualify as the subnet not being the same, as per block 1050. Process flow terminates, as per block 1045.

If the IP address associated with the NIC of the client IHS is an IPv6 address, as per block 1020, the client endpoint may transmit a SMC-R proposal message to the server endpoint. The SMC-R proposal message may include a list of prefixes utilized by the network that couples to the NIC of the client IHS to which the client's IP global address and the client's IP link local address are associated, as per block 1055. The server endpoint may receive the SMC-R proposal message from the client endpoint. The server endpoint may then compare the list of prefixes utilized by the network that couples to the NIC of the server IHS to which the server's IP global address and the server's IP link local address are associated, to the list of prefixes sent by the client endpoint in the SMC-R proposal message.

If any of the prefixes utilized by the network that couples to the NIC of the server IHS to which the server's IP global address and the server's IP link local address are associated matches any prefixes in the list of prefixes sent by the client endpoint in the SMC-R proposal message, the connection qualifies, as per block 1060. If the connection qualifies, the connection is suitable for transmitting information using the SMC-R protocol and the server endpoint may transmit a SMC-R accept message to the client endpoint, as per block 1035. Upon receipt of the SMC-R accept message from the server endpoint, the client endpoint may transmit a SMC-R confirm message to the server endpoint. The server endpoint may receive the SMC-R confirm message from the client endpoint, as per block 1040. With the handshake complete, the server endpoint and client endpoint may establish a connection utilizing the SMC-R protocol. Process flow terminates, as per block 1045.

If none of the prefixes utilized by the network that couples to the NIC of the server IHS to which the server's IP global address and the server's IP link local address are associated matches any prefixes in the list of prefixes sent by the client endpoint in the SMC-R proposal message, the connection does not qualify, as per decision block 1060. The server endpoint may transmit a SMC-R decline message to the client endpoint that may include reason for the failure to qualify as the subnet not being the same, as per block 1050. Process flow terminates, as per block 1045.

In one embodiment, a particular network connection may employ an IPv4 protocol or an IPv6 protocol. However, in that embodiment, the particular network connection may not employ both IPv4 and IPv6 protocols at the same time. Alternative embodiments of the communication system may employ multiple network connections where some network connections use the iPv4 protocol and other network connections use IPv6 protocol.

The network connection between a client VIPA and a server VIPA may employ a particular protocol for the duration of that network connection. When the client VIPA is communicating with the server VIPA utilizing IPv4, the client VIPA may not change protocols from IPv4 to IPv6 without first terminating the connection and establishing a new network connection between the client VIPA and the server VIPA utilizing IPv6. A particular protocol may be utilized while the network connection between the client VIPA and the server VIPA exists for the duration of that network connection.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   establishing a network connection between a first information handling system (IHS) and a second IHS, the first and second IHSs including respective interfaces, the network connection being a network connection that uses a first protocol version that employs subnets or a second protocol version that employs prefixes;
   receiving, from the first IHS by the interface of the second IHS, a proposal including subnet information related to the interface of the first IHS if the network connection is employing the first protocol version for the network connection, wherein the first IHS includes a first virtual IP address (VIPA) that exhibits an address other than an address in the subnet of the interface of the first IHS if the network connection is employing the first protocol version for the network connection;
   receiving, from the first IHS by the interface of the second IHS, a proposal including prefix information including a list of prefixes related to the interface of the first IHS if the network connection is employing the second protocol version for the network connection, wherein the first IHS includes a first virtual IP address (VIPA) that exhibits an address other than any address in the prefixes of the interface of the first IHS if the network connection is employing the second protocol version for the network connection;
   determining, by the second IHS, subnet information or prefix information related to the interface of the second IHS that receives the proposal;
   testing, by the second IHS, to determine if the subnet information of the interface of the second IHS matches the subnet information of the interface of the first IHS or the prefix information matches at least one prefix of the list of prefixes; and
   qualifying, by the second IHS, the network connection to employ a particular protocol if there is a match between the subnet information of the interface of the second IHS and the subnet information of the interface of the first IHS or there is a match between the prefix information of the interface of the second IHS and at least one prefix of the list of prefixes, and otherwise disqualifying the network connection from using the particular protocol if there is no match, wherein the particular protocol is a shared memory communications over remote direct memory access protocol.

2. The method of claim 1, wherein the first IHS comprises a client and the second IHS comprises a server.

3. The method of claim 1, wherein the first and second IHSs communicate via the particular protocol in response to qualifying.

4. The method of claim 1, wherein the first protocol version is IPv4 and the second protocol version is IPv6.

5. The method of claim 1, wherein the particular protocol is a remote direct memory access protocol.

6. The method of claim 1, wherein the second IHS includes a second virtual IP address (VIPA) that exhibits an address other than an address in the subnet of the interface of the second IHS.

7. The method of claim 1, wherein the second IHS includes a second virtual IP address (VIPA) that exhibits an address other than any address in the prefixes of the interface of the second IHS.

8. A network information handling system (IHS), comprising:
   a processor;
   a memory coupled to the processor, the memory including a networking stack that is configured to:
   establish a network connection between the network IHS and another IHS, the network IHS and the another IHS including respective interfaces, the network connection being a network connection that uses a first protocol version that employs subnets or a second protocol version that employs prefixes for the network connection;
   receive, from the another IHS via the interface of the network IHS, a proposal including subnet information related to the interface of the another IHS if the network connection is employing the first protocol version for the network connection, wherein the first IHS includes a first virtual IP address (VIPA) that exhibits an address other than an address in the subnet of the interface of the first IHS if the network connection is employing the first protocol version for the network connection;
   receive, from the another IHS via the interface of the network IHS, a proposal including prefix information including a list of prefixes related to the interface of the another IHS if the network connection is employing the second protocol version, wherein the first IHS includes a first virtual IP address (VIPA) that exhibits an address other than any address in the prefixes of the interface of the first IHS if the network connection is employing the second protocol version for the network connection;
   determine subnet information or prefix information related to the interface of the network IHS that receives the proposal;
   test to determine if the subnet information of the interface of the network IHS matches the subnet information of the interface of the another IHS or the prefix information matches at least one prefix of the list of prefixes; and
   qualify the network connection to employ a particular protocol if there is a match between the subnet information of the interface of the network IHS and the subnet information of the interface of the another IHS or there is a match between the prefix information of the interface of the network IHS and at least one prefix of the list of prefixes, and otherwise disqualifying the network connection from using the particular protocol if there is no match, wherein the particular protocol is a shared memory communications over remote direct memory access protocol.

9. The network IHS of claim 8, wherein the network IHS comprises a server and the another IHS comprises a client.

10. The network IHS of claim 8, wherein the network IHS and the another IHS communicate via the particular protocol in response to qualifying.

11. The network IHS of claim 8, wherein the first protocol version is IPv4 and the second protocol version is IPv6.

12. The network IHS of claim 8, wherein the particular protocol is a remote direct memory access protocol.

13. The network IHS of claim 8, wherein the network IHS includes a second virtual IP address (VIPA) that exhibits an address other than an address in the subnet of the interface of the network IHS.

14. The network IHS of claim 8, wherein the network IHS includes a second virtual IP address (VIPA) that exhibits an address other than any address in the prefixes of the interface of the network IHS.

* * * * *